US008347396B2

(12) United States Patent
Grigsby et al.

(10) Patent No.: US 8,347,396 B2
(45) Date of Patent: Jan. 1, 2013

(54) PROTECT SENSITIVE CONTENT FOR HUMAN-ONLY CONSUMPTION

(75) Inventors: Travis M. Grigsby, Austin, TX (US); Margaret Beth Morgan, Austin, TX (US); Lisa Anne Seacat, San Francisco, CA (US); David Warren Zysk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 11/948,563

(22) Filed: Nov. 30, 2007

(65) Prior Publication Data

US 2009/0144829 A1    Jun. 4, 2009

(51) Int. Cl.
*G06F 7/04* (2006.01)
(52) U.S. Cl. ............ 726/26; 726/22; 713/152; 713/168; 713/187; 380/268
(58) Field of Classification Search ............ 726/26
See application file for complete search history.

(56) References Cited

U.S. PATENT DOCUMENTS

| 7,685,271 | B1* | 3/2010 | Schneider et al. | 709/224 |
| 7,783,741 | B2* | 8/2010 | Hardt | 709/224 |
| 7,984,297 | B2* | 7/2011 | Bohannon et al. | 713/170 |
| 2003/0120949 | A1* | 6/2003 | Redlich et al. | 713/200 |
| 2004/0261016 | A1 | 12/2004 | Glass et al. | |
| 2005/0060643 | A1* | 3/2005 | Glass et al. | 715/501.1 |
| 2005/0114453 | A1* | 5/2005 | Hardt | 709/206 |
| 2006/0031306 | A1* | 2/2006 | Haverkos | 709/206 |
| 2006/0095966 | A1* | 5/2006 | Park | 726/22 |

FOREIGN PATENT DOCUMENTS

WO   2005048544 A1   5/2005

OTHER PUBLICATIONS

Rodriguez "Email Address Munger/Email Address Obfuscator" May 2003, http://www.AddressMunger.com, pp. 1-3 (hereinafter Rodriguez).*
"Method for Test Automation of Obfuscated Code", IPCOM000124436D, Apr. 20, 2005, pp. 1-2 (Abstract).
"Just in Time Compression and Obfuscation of HTML and Script Languages", IPCOM000144059D, Dec. 17, 2006, pp. 1-2 (Abstract).

(Continued)

*Primary Examiner* — Shewaye Gelagay
(74) *Attorney, Agent, or Firm* — Yee & Associates, P.C.; Libby Z. Toub

(57) ABSTRACT

A computer implemented method, apparatus, and computer usable program product for protecting sensitive content. In response to receiving a selection of content, the process determines whether the content is of a sensitive content type based on a policy. The process then designates the content as the sensitive content in response to the content being of a sensitive content type. Thereafter, the process generates a sensitive content reference for publication and stores the sensitive content in a data structure, wherein the data structure associates the sensitive content with the sensitive content reference. Subsequently, in response to receiving a request from a requester for the sensitive content reference, the process obfuscates the sensitive content using a selected obfuscation algorithm to form obfuscated content, and returns the obfuscated content to the requester.

18 Claims, 5 Drawing Sheets

OTHER PUBLICATIONS

PWNtcha—Caca Labs, "PWNtcha—Captcha Decoder", [retrieved from internet on Sep. 16, 2011], 5 pages, <http://caca.zoy.org/wiki/PWNtcha>.

"The Captcha Project—Bongo", Carnegie Mellon School of Computer Science, [retrieved from internet on Sep. 16, 2011], Copyright 2000-2003, 1 page, <http://captcha.net/captchas/bongo/>.

"OddThinking 1.0.1 Obsolete", [retrieved from internet on Nov. 5, 2012], 14 pages, <http://www.somethinkodd.com/oddthinking/emailshroud-wordpress-plugin/emailshroud-version-history/emailshroud-wordpress-plugin-1-0/>.

Snyder, "Email Address to Image Converter", [retrieved from internet on Sep. 16, 2011], Mar. 2003, 2 pages, <http://chxo.com/labelgen/>.

"TinyMailto.com e-mail retrieve page", [retrieved from internet on Sep. 16, 2011], 1 page, <http://tinymailto.com/amitagarwal>.

Video Captcha (Score:2, Interesting), Sneakerfish, [retrieved from internet on Nov. 5, 2012], Sep. 6, 2006, 1 page, <http://it.slashdot.org/comments.pl?sid=195888&threshold=1&commentsort=0&mode=thread&cid=16052454>.

\* cited by examiner

*FIG. 4*

```
class ContentObfuscator ⟵ 402
{
    private Hashmap<Reference, SensitiveContent> hm;

public Reference store (SensitiveContent content)
    {
        Reference ref = generateLink () ;
        hm.add(ref, content) ;
        return ref ;
    } public ObfuscatedContent get (Reference ref) ;
    {
        SensitiveContent sc = hm.get (ref) ;

ObfuscationCommandObject obfuscationCommand;
        if (isContentTypeSensitive (sc.getContentType () )
        {
            obfuscationCommand =
findBestKnownObfuscation (sc.getContentType () ) ;
        }
        else
        {
            obfuscationCommand = new
ObfuscationCommandObject (ObfuscationCommandObject.NULL_OBFUSCATION) ;
        }
        return obfuscationCommand.obfuscate (sc) ;
    } public ObfuscationCommandObject findBestKnownObfuscation
(ContentTypecontentType)
    {
    }
    public boolean isContentTypeSensitive (ContentType contentType)
    {
    }
}
Class SensitiveContent ⟵ 404
{
    contentType contentType
    ...
    public ContentType get ContentType ()
            return contentType;
            content Content;
    {
        ...
    }
}
```

400 ⟵

402 — class ContentObfuscator
406 — public ObfuscatedContent get
408 — public ObfuscationCommandObject findBestKnownObfuscation
410 — public boolean isContentTypeSensitive
404 — Class SensitiveContent

PROTECT SENSITIVE CONTENT FOR HUMAN-ONLY CONSUMPTION

BACKGROUND OF THE INVENTION

1. Field of the Invention

The present invention relates generally to an improved data processing system and in particular, to a computer implemented method and apparatus for protecting sensitive content. More particularly, the present invention is directed to a computer implemented method, apparatus, and computer usable program product for obfuscating sensitive content to prevent detection and collection by data collection bots.

2. Description of the Related Art

The World Wide Web, also referred to as the Web, is a distributed information retrieval system in which web pages formatted in Hypertext Markup Language (HTML) are linked via a Hypertext Transfer Protocol to other web pages. These web pages contain information such as, for example text, audio, video, and graphic files, and may be accessed by implementing a web browser.

Some users of the Web may elect to post sensitive content. Sensitive content is often targeted for collection by malicious Web users. In many instances, sensitive content is personal identifying information, such as, for example, a name, telephone number, email address, social security number, or screen name. Sensitive content may also include images, videos, or any other information that may be presented on a web page or accessible via the Internet. The sensitive content may be posted on a social networking web site, a discussion forum, an online auction site, or any other web page.

Because the Web includes several billion web pages, searching web pages for sensitive content is a tedious and time consuming task. Consequently, malicious users have employed data collection bots to scan web pages for automatically detecting and collecting sensitive content. Data collection bots are applications that scan web pages to automatically detect and collect sensitive content. To prevent these data collection bots from detecting sensitive content, some Web users have obfuscated the sensitive content by implementing obfuscation algorithms. Obfuscation algorithms are sometimes referred to as CAPTCHA™ tests. CAPTCHA is an acronym for "Completely Automated Public Turing test to tell Computers and Humans Apart." CAPTCHA tests often require a modicum of human intelligence to solve. For example, some CAPTCHA™ tests obfuscate content to form obfuscated content by distorting the text or eliminating spaces between the letters to prevent data collection bots from discerning individual letters. Applying obfuscation algorithms to content forms obfuscated content.

One example of a currently used obfuscation algorithm involves the generation of sensitive content that omits obvious identifiers often targeted by data collection bots. For example, a data collection bot may be programmed to identify email addresses by locating certain identifiers, such as the @ symbol in a string of characters followed by .com, .edu, or some other similar suffix. To defeat these data collection bots, the email addresses may be written to omit the identifiers. For example, a fictitious email address such as user@email.com may be posted as "user <at> email <dot> com". However, data collection bots may evolve over time to detect these variations of presenting email addresses and other similar types of sensitive content.

Another currently used obfuscation algorithm involves creating images of text-based sensitive content. Data collection bots searching for text-based sensitive content would be unable to recognize the information contained in the image. The evolution of data collection bots may eventually enable these data collection bots to discern text presented in an image. Data collection bots are able to evolve to circumvent existing and newly developed obfuscation algorithms because obfuscated content is often posted on the Web for long periods of time. Consequently, malicious users are able to evolve their data collection bots to circumvent the obfuscation algorithm. An improved computer implemented method, apparatus, and computer usable program product are necessary to overcome these problems.

SUMMARY OF THE INVENTION

The illustrative embodiments described herein provide a computer implemented method, apparatus, and computer usable program product for protecting sensitive content. In response to receiving a selection of content, the process determines whether the content is of a sensitive content type based on a policy. The process then designates the content as the sensitive content in response to the content being of a sensitive content type. Thereafter, the process generates a sensitive content reference for publication and stores the sensitive content in a data structure, wherein the data structure associates the sensitive content with the sensitive content reference. Subsequently, in response to receiving a request from a requestor for the sensitive content reference, the process obfuscates the sensitive content using a selected obfuscation algorithm to form obfuscated content, and returns the obfuscated content to the requester.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is pseudocode for protecting sensitive content in accordance with an illustrative embodiment;

DETAILED DESCRIPTION OF THE PREFERRED EMBODIMENT

Figure 1:
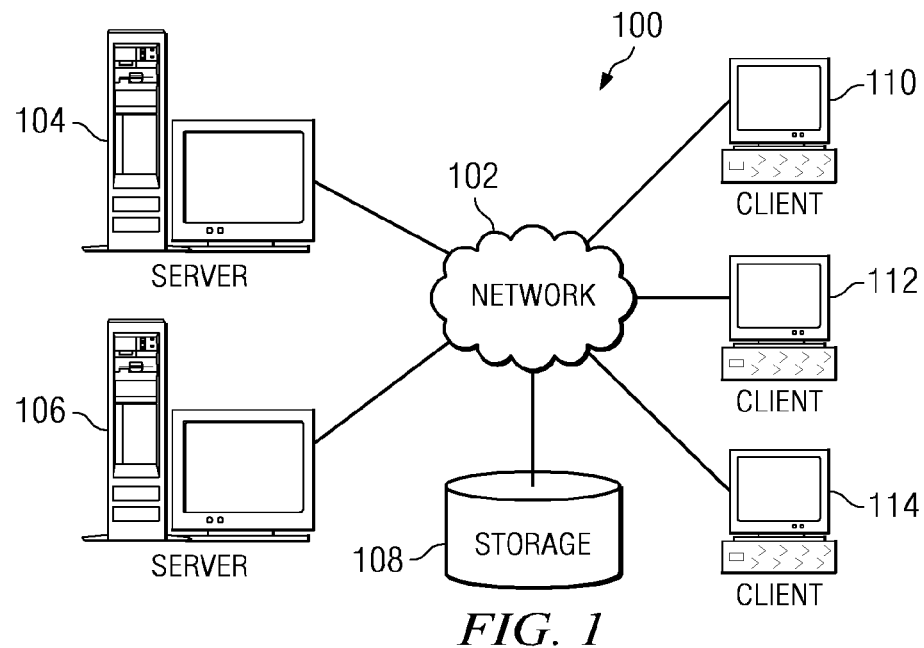
FIG. 1 is a pictorial representation of a network data processing system in which illustrative embodiments may be implemented.
Figure 2:
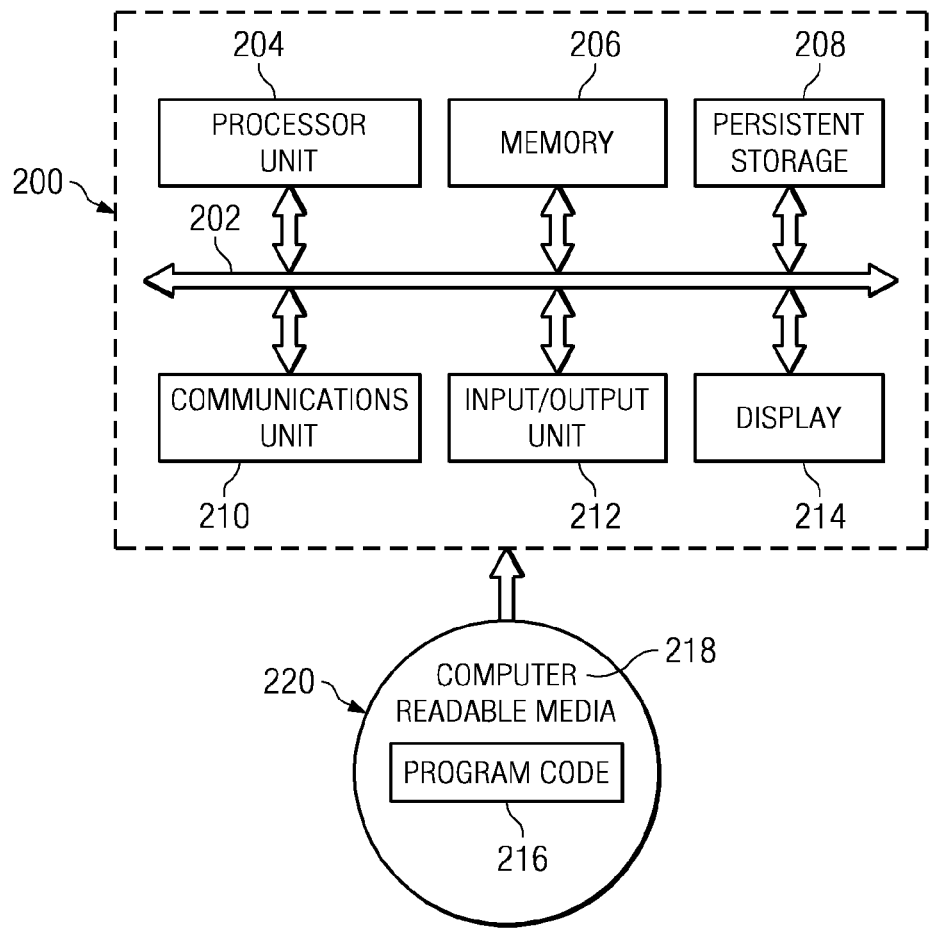
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing system in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. Clients 110, 112, and 114 are examples of devices that may be utilized for transmitting or receiving audio-based communication in a network, such as network 102. Clients 110, 112, and 114 may be, for example, a personal computer, a laptop, a tablet PC, a network computer, a hardwired telephone, a cellular phone, a voice over internet communication device, or any other communication device or computing device capable of transmitting data. In the depicted example, server 104 provides data, such as boot files, operating system images, and applications to clients 110, 112, and 114. Clients 110, 112, and 114 are coupled to server 104 in this example.

Users of data processing system 100 may operate a client, such as client 110 for posting sensitive content on a web page. The sensitive content may be obfuscated by a content obfuscator application stored on a server, such as server 104, as described herein.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, memory 206 or a cache. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a computer implemented method, apparatus, and computer usable program product for protecting sensitive content. Content is, for example, any data or information that may be disbursed over the Web. The content may include, without limitation, email addresses, images, telephone or Voice over Internet Protocol numbers, instant messenger screen names, social security numbers, or any other type of content. Sensitive content is content that is subject to protection by obfuscation.

The process determines whether content is of a sensitive content type in response to receiving the selection of content. In one embodiment, content may be determined to be sensitive by comparison with a set of rules or policies defining sensitive content types. Sensitive content types are categories of content. Thus, if the set of rules or policies identifies email addresses and telephone numbers as sensitive content types, then the process may determine that a selection of content that is an email address is of a sensitive content type.

The process then designates the content as sensitive content in response to the content being of a sensitive content type. The process may designate the content as sensitive by storing it in a sensitive content data structure. Thereafter, the process generates a sensitive content reference for publication. A sensitive content reference is a reference associated with sensitive content. For example, the sensitive content reference may be a web address and file name. Alternately, the sensitive content reference may be a unique string of characters associated with the sensitive content in a hash table or other data structure. The sensitive content reference is published rather than the sensitive content. The sensitive content reference is usable to locate the sensitive content.

The process then stores the sensitive content in a data structure. The data structure associates the sensitive content with the sensitive content reference. Thereafter, in response to receiving a request for content including the sensitive content reference, the process locates the sensitive content using the sensitive content reference and obfuscates the sensitive content using a selected obfuscation algorithm to form obfuscated content. The process then returns the obfuscated content to a requester. A requester is any software component from which a selection of content originated. Thus, for example, if a web application forwards a selection of content for obfuscation, then the web application is also the requester.

An obfuscation algorithm is an algorithm for obfuscating sensitive content. The obfuscation algorithm may be any currently available or later developed obfuscation algorithm. The obfuscation algorithm may obfuscate the sensitive content in any manner. For example, the obfuscation algorithm may distort the sensitive content, hide portions of the sensitive content so that the content is never fully displayed at any given time, or convert the sensitive content into an image. An obfuscation algorithm may be designated as selected according to a user's express selection or according to one or more conditions set forth in an obfuscation algorithm policy. The conditions may include, for example, an amount of time that the obfuscation algorithm has been used, the number of times that the obfuscation algorithm has been circumvented, or the type of sensitive content that is being obfuscated.

In a non-limiting embodiment, obfuscation of sensitive content to form obfuscated content may be performed at rendering time by a web browser. In another embodiment, obfuscation of sensitive content may be completed by a web server at serve time.

If after the sensitive content identifier has been published and the type of sensitive content is no longer deemed sensitive, the process may replace the sensitive content identifier with the content originally identified as sensitive content. Thus, if email addresses are no longer considered sensitive content, then sensitive content references and/or obfuscated content incorporated in a web page may be replaced with the email address in unobfuscated form.

Publishing, as used with reference to a sensitive content reference or obfuscated content, is the dissemination of the content to others. Publishing may include, for example, posting or uploading information in a location accessible to the public. The location may be a web forum, a directory, a blog, or other location accessible via the Internet.

Figure 3:
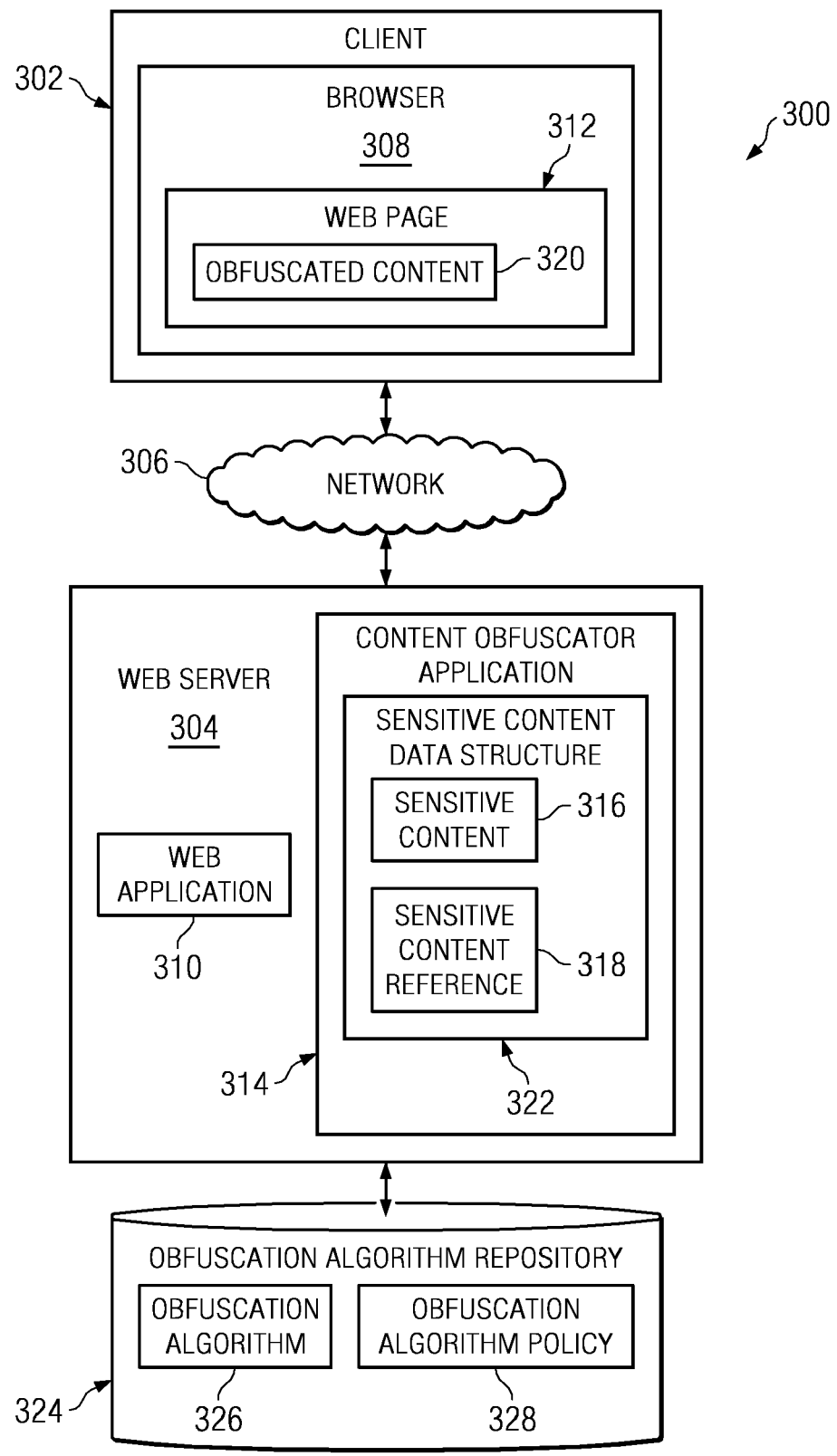
FIG. 3 is a diagram of a data processing system for protecting sensitive content in accordance with an illustrative embodiment.

FIG. 3 is a diagram of a data processing system for protecting sensitive content in accordance with an illustrative embodiment. Data processing system 300 is a data processing system such as network data processing system 100 in FIG. 1. Data processing system 300 includes client 302. Client 302 is a client, such as client 110, 112, and 114 in FIG. 1. In addition, data processing system 300 includes web server 304. Web server 304 is a server, such as servers 104 and 106 in FIG. 1. Data may be transmitted between client 302 and web server 304 via network 306. Network 306 is a network such as network 102 in FIG. 1.

Client 302 includes browser 308. Browser 308 is a software application usable to interact with web sites on the Internet. For example, a user (not shown) may provide browser 308 with a web address to access a particular web site accessible over a network, such as the Internet or a local area network. The user may then navigate to the various web pages of the web site, such as web page 312, and interact with the content hosted on the web site. Browser 308 may be, for example, Mozilla Firefox®, Internet Explorer®, and Netscape Navigator®. Mozilla Firefox is a registered trademark of Mozilla Corporation. Internet Explorer is a registered trademark of Microsoft Corporation. Netscape Navigator is a registered trademark of Netscape Communications Corporation.

The web sites accessed by a user operating browser 308 are hosted by web servers, such as web server 304. In this illustrative example, web server 304 hosts web application 310 for generating content requested by a user operating browser 308. The content is then presented to the user in web page 312 via browser 308. Web application 310 is a software application having computer code for generating the requested content. Web application 310 is accessible to users over an network, such as an intranet or the Internet. Web application 310 may be, for example, an online auction site, an email application, a social networking application, a retail web site, a blog, or a web forum.

In this illustrative example in FIG. 3, web server 304 also hosts content obfuscator application 314. Content obfuscator application 314 is a software application for protecting sensitive content 316. Sensitive content 316 is any content subject to detection and collection by a data collection bot that a user may not want collected by others. Sensitive content 316 may be, for example, an email address, social security number, telephone number, image, or any other content deemed sensitive content.

Content obfuscator application 314 protects sensitive content 316 by replacing sensitive content 316 with sensitive content reference 318. Sensitive content reference 318 is a unique reference associated with sensitive content 316. Sensitive content reference 318 may be, for example, a file path or unique string of text that may be used to identify sensitive content 316 for obfuscation and publication.

Once content is requested that includes sensitive content reference 318, content obfuscator application 314 identifies sensitive content 316 from a data structure, and obfuscates sensitive content 316 to form obfuscated content 320. Obfuscated content 320 is then published in a web page, such as web page 312 and then presented to a user operating a browser. The publication of obfuscated content 320 on web page 312 in place of sensitive content 316 protects sensitive content 316 from detection by a data collection bot.

Selection of sensitive content may be made by a user. For example, the user may type in an email address, highlight the email address and select an option to designate the email address as sensitive content 316. The option may be provided by browser 308, in a right click menu, or from the web page. Certain content selected by a user for protection may not actually require protection, and thus may not be subject to obfuscation. For example, future technological advances may eliminate the delivery of unsolicited email, also known as spam.

In that event, email addresses may be considered a content type that does not require protection. Consequently, if a web server receives from a user the selection of an email address for protection, the web server or web application may refrain from obfuscating the email address. In this example, the content may be published in unobfuscated form. Content in unobfuscated form is the form in which content was in at the time of selection.

In an alternate embodiment, the selection of sensitive content 316 may be determined automatically web server 304 according to a sensitive content designation policy. The policy may be a list of sensitive content types. Subsequently, when generating a web page in response to a user's request for content, a web application may scan the web page and designate content types as sensitive content according to the policy. In this manner, a user who has inadvertently failed to designate content as sensitive content 316 may still have the content automatically designated as sensitive content 316 according to the sensitive content designation policy. Furthermore, web server 304 would instruct content obfuscator application 314 to store the selected content into sensitive content data structure 322.

Sensitive content data structure 322 is a data structure storing sensitive content 316 and sensitive content reference 318. Sensitive content data structure 322 is a data structure, including, without limitation, a hash table, an array, a link list, or any other type of data structure. Sensitive content data structure 322 enables content obfuscator application 314 to associate sensitive content reference 318 with sensitive content 316. Thus, if content obfuscator application 314 is presented with sensitive content reference 318, content obfuscator application 314 may identify sensitive content 316 using sensitive content data structure 322. Thereafter, content obfuscator application 314 may apply a selected obfuscation algorithm to form obfuscated content 320. Obfuscated content 320 may then be published on a web page such as web page 312.

The selected obfuscation algorithm may be stored in obfuscation algorithm repository 324. In these examples, obfuscation algorithm repository 324 is a data repository for storing obfuscation algorithm 326 and obfuscation algorithm policy 328. Obfuscation algorithm 326 is one or more obfuscation algorithms that may be applied for converting sensitive content to obfuscated content.

Obfuscation algorithm policy 328 is a set of rules governing the selection of the selected obfuscation algorithm from obfuscation algorithm 326 for obfuscating sensitive content. In these examples, a set contains to one or more items in the set. For example, obfuscation algorithm policy 328 may include a policy dictating which obfuscation algorithms may be used with particular types of sensitive content. Thus, email addresses may be obfuscated with a different obfuscation algorithm than telephone numbers or images. In addition, the policies of obfuscation algorithm may specify conditions that must be satisfied in order for an obfuscation policy to be considered a selected obfuscation policy. For example, the conditions may include an amount of time that the obfuscation algorithm has been used, the number of times that the obfuscation algorithm has been circumvented, or the type of sensitive content that is being obfuscated.

In an illustrative example, a user operating a browser, such as browser 308, directs a request to web application 310 to publish sensitive content 316 on web page 312. For example, the user may elect to post the user's email address on a publicly accessible Web forum hosted by web server 304. The user, interacting with web application 310, provides web application 310 with the user's email and selects an option to designate the email address as sensitive content 316.

Upon receiving the selection of sensitive content, web application 310 may pass sensitive content 316 to content obfuscator application 314. Upon receipt of sensitive content 316, content obfuscator application 314 generates sensitive content reference 318 and stores both sensitive content 316 and sensitive content reference 318 in sensitive content data structure 322. Content obfuscator application 314 returns sensitive content reference 318 to web application 310 for inclusion in the web page.

Thereafter, web application 310 may receive a request for presentation of web page 312. While generating the content for web page 312, web application 310 may encounter sensitive content reference 318. Web application 310 passes sensitive content reference 318 to content obfuscator application 314. Content obfuscator application 314 locates sensitive content reference 318 in sensitive content data structure 322 and identifies sensitive content 316. Content obfuscator application 314 then identifies a selected obfuscation algorithm from obfuscation algorithm 326 using obfuscation algorithm policy 328. Content obfuscator application 314 then returns to web application 310 obfuscated content 320. Web application then publishes obfuscated content 320 in web page 312. Web page 312 is presented to a user operating browser 308.

In the illustrative example described above, sensitive content was obfuscated at serve time. In other words, obfuscation of sensitive content was accomplished while web page 312 was being generated by web application 310. In an alternate embodiment, sensitive content 316 may be obfuscated at render time. In this embodiment, sensitive content 316 may be obfuscated by a client-side content obfuscation application applied after web application 310 has generated web page 312. Additionally, the client-side content obfuscation application, such as one implemented as a browser plugin, may be operable to automatically generate sensitive content references as the user is inputting content, such as an email address or telephone number.

In this embodiment, a client side browser may detect a sensitive content reference in a web page, locate or request the associated sensitive content and a selected obfuscation algorithm, and obfuscate the sensitive content. The browser may then publish the obfuscated content. The associated sensitive content and the selected obfuscation algorithm may be stored remotely from the data processing system hosting the browser.

A sensitive content designation may be subsequently removed if protection of that particular content type is deemed unnecessary. Thus, if it can be determined that data collection bots no longer collect telephone numbers from web pages, then the telephone numbers would no longer need to be obfuscated before publication. Consequently, content obfuscator application 314 may abstain from returning a sensitive content reference in response to receiving a selection of sensitive content. If content obfuscator application 314 does not return a sensitive content reference, then web application 310 would not detect the sensitive content reference when generating the web page. Consequently, obfuscation of the content would not occur.

FIG. 4 is pseudocode for protecting sensitive content in accordance with an illustrative embodiment. Pseudocode 400 is a simplified program code such as program code 216 in FIG. 2. Pseudocode 400 is an example of code that may be included in computer readable media, such as computer readable media 218 in FIG. 2.

Pseudocode 400 includes class ContentObfuscator 402 and class SensitiveContent 404. Class ContentObfuscator 402 is program code for enabling a client to request obfuscated content using a reference. Class SensitiveContent 404 is program code for representing sensitive content and providing information as to the content type. For example, the content type may be an email address, telephone number, social security number, image, or any other type of content.

Pseudocode 400 includes code section 406 for selecting a selected obfuscation algorithm to apply to a particular content type. The selection of the selected obfuscation algorithm may be based, in part, upon rules described in a set of obfuscation algorithm policies. In addition, code section 406 includes code for preventing the obfuscation of content not considered sensitive.

Pseudocode 400 also includes code section 408 for identifying a selected obfuscation algorithm. The selected obfuscation algorithm may be determined, in part, according to a set of obfuscation algorithm policies, such as obfuscation algorithm policy 328 in FIG. 3. The set of obfuscation algorithm policies may be continually updated based upon the current state of knowledge regarding the state of data collection bot intelligence. Thus, if it can be determined that data collection bots have evolved to circumvent image-based obfuscation algorithms, then such obfuscation algorithms would no longer be considered selected obfuscation algorithms for use in protecting sensitive content.

Code section 410 enables a content obfuscation application to determine whether a particular content type should be designated as sensitive. This determination may be made based, in part, upon a set of obfuscation algorithm policies that may indicate the type of information being harvested by data collection bots.

Figure 5:
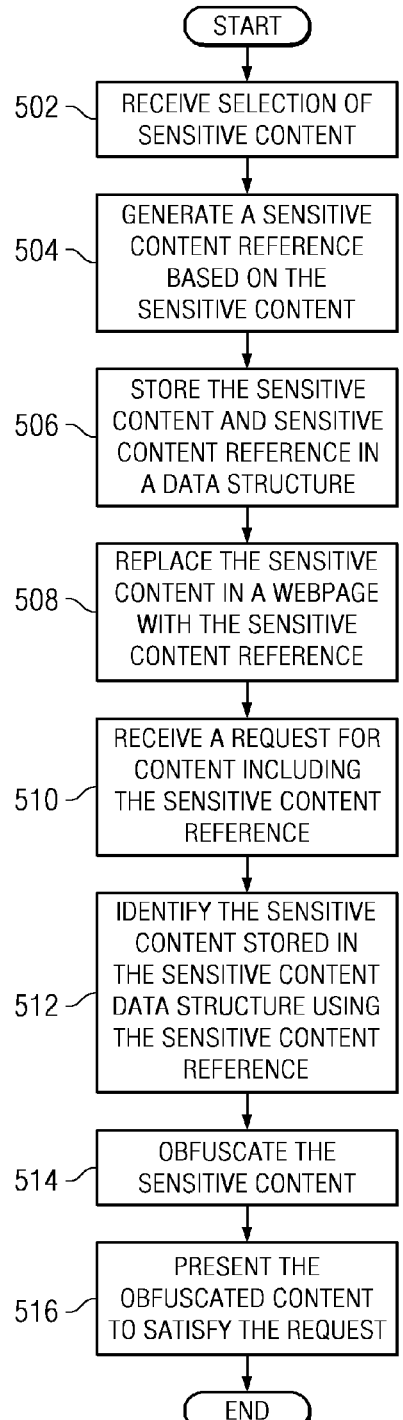
FIG. 5 is a flowchart of a process for obfuscating sensitive content in accordance with an illustrative embodiment.

FIG. 5 is a flowchart of a process for obfuscating sensitive content in accordance with an illustrative embodiment. The process may be performed by a server such as web server 304 in FIG. 3.

The process begins by receiving a selection of sensitive content (step 502). The process then generates a sensitive content reference based on the sensitive content (step 504). Thereafter, the sensitive content and sensitive content reference are stored in a data structure (step 506) and the process replaces the sensitive content in a web page with the sensitive content reference (step 508).

Subsequently, the process receives a request for content including the sensitive content reference (step 510). The process then identifies the sensitive content stored in the sensitive content data structure using the sensitive content reference (step 512). The process then obfuscates the sensitive content (step 514), presents the obfuscated content to satisfy the request (step 516) and terminates thereafter.

Figure 6:
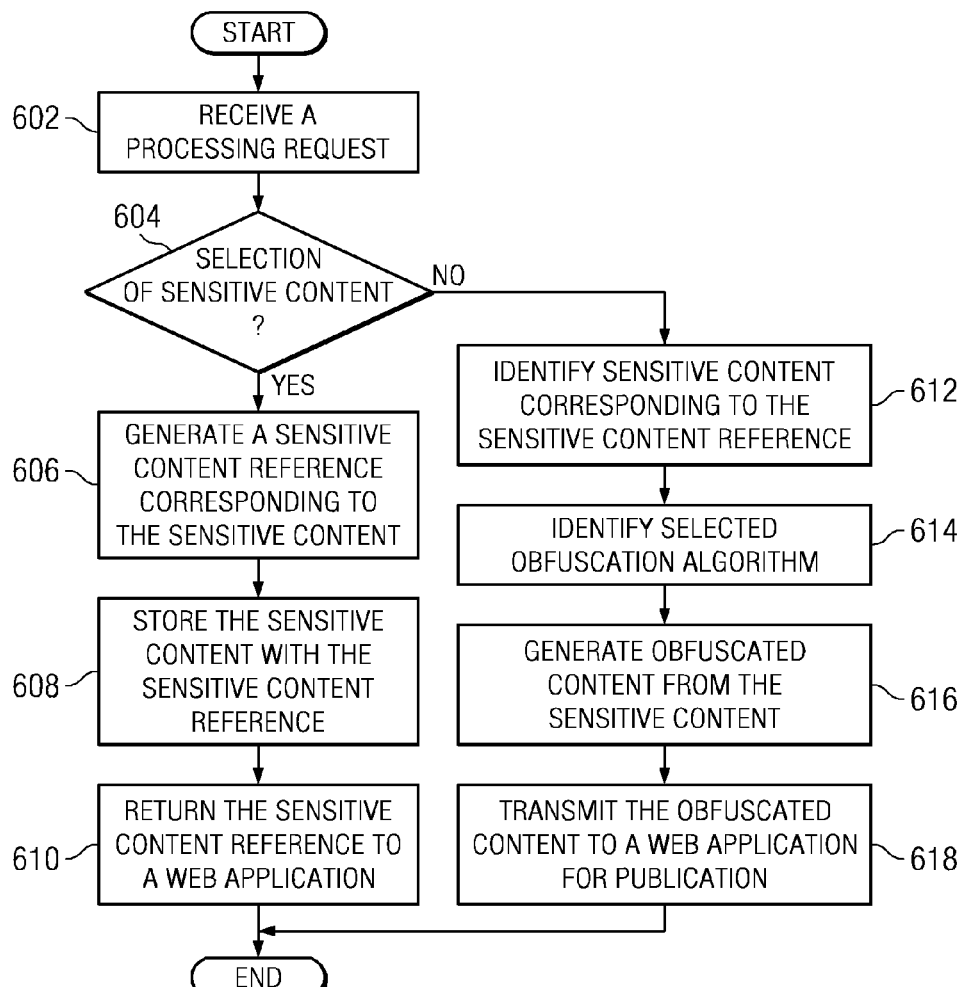
FIG. 6 is a flowchart of a process for processing sensitive content in accordance with an illustrative embodiment.

FIG. 6 is a flowchart of a process for processing sensitive content in accordance with an illustrative embodiment. The process may be performed by a content obfuscator application, such as content obfuscator application 314 in FIG. 3.

The process beings by receiving a processing request (step 602). The processing request may be for a selection of sensitive content or a sensitive content reference. The process then makes the determination as to whether the processing request is for a selection of sensitive content (step 604). If the process makes the determination that the processing request is for a selection of sensitive content, then the process generates a sensitive content reference corresponding to the sensitive content (step 606). Thereafter, the process stores the sensitive content with the sensitive content reference (step 608).

The process then returns the sensitive content reference to a web application (step 610) and the process terminates thereafter. The returned sensitive content reference may then be used to replace the sensitive content in a web page.

Returning now to step 604, if the process makes the determination that the processing request is not for a selection of sensitive content, then the sensitive content is a sensitive content reference and the process identifies sensitive content corresponding to the sensitive content reference (step 612). The process then identifies a selected obfuscation algorithm (step 614) and generates obfuscated content from the sensitive content (step 616). The obfuscated content is generated by applying a selected obfuscation algorithm to the sensitive content.

Thereafter, the process transmits the obfuscated content to a web application for publication (step 618), and the process terminates thereafter.

Figure 7:
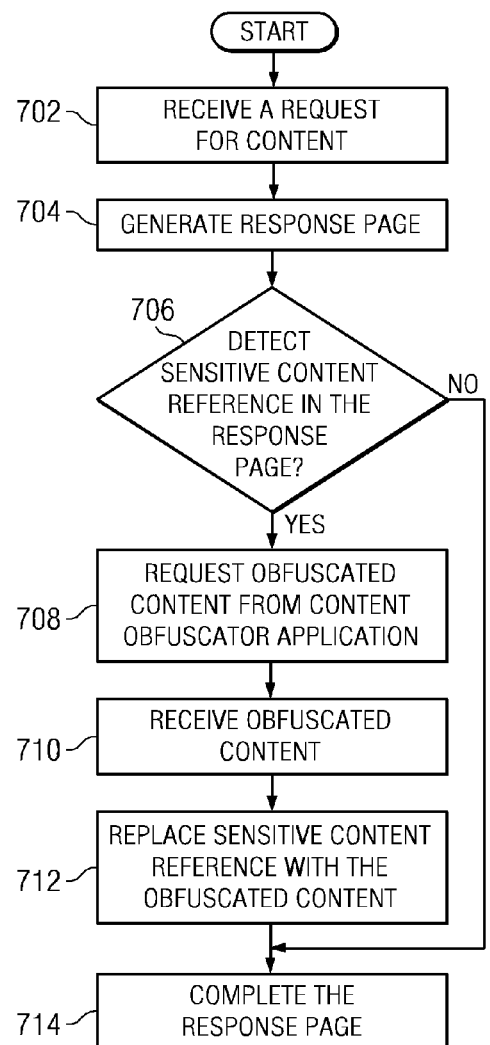
FIG. 7 is flowchart of a process for publishing obfuscated content in accordance with an illustrative embodiment.

FIG. 7 is flowchart of a process for publishing obfuscated content in accordance with an illustrative embodiment. The process may be performed by a software component such as web application 310 in FIG. 3.

The process begins by receiving a request for content (step 702). The process begins generating a response page (step 704) and makes the determination as to whether a sensitive content reference is detected in the response page (step 706). If the process detects the presence of a sensitive content reference, then the process requests obfuscated content from a content obfuscator application (step 708).

The process receives the obfuscated content (step 710) and replaces the sensitive content reference with the obfuscated content (step 712). The process then completes the response page (step 714) and terminates thereafter.

Returning now to step 706, if the process makes the determination that a sensitive content reference is not detected in the requested page, then the process continues to step 714.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for protecting sensitive content. In response to receiving a selection of content, the process determines whether the content is of a sensitive content type based on a policy. The process then designates the content as the sensitive content in response to the content being of a sensitive content type. Thereafter, the process generates a sensitive content reference for publication and stores the sensitive content in a data structure, wherein the data structure associates the sensitive content with the sensitive content reference. Subsequently, in response to receiving a request from a requester for the sensitive content reference, the process obfuscates the sensitive content using a selected obfuscation algorithm to form obfuscated content, and returns the obfuscated content to the requester.

The computer implemented method and apparatus disclosed herein facilitates the protection of sensitive content. Using the methods described herein, obfuscated content may be created using selected obfuscation algorithms. Obfuscating content when the sensitive content is requested enables the sensitive content to be obfuscated using the newest obfuscation algorithm. Data collection bots are less likely to be able to detect and circumvent newer obfuscation algorithms. Furthermore, posting a sensitive content reference rather than obfuscated content prevents exposure of the obfuscated content to malicious users, thereby preventing those malicious users from designing anti-obfuscation algorithms to circumvent obfuscation algorithms.

Another benefit that may be recognized by using the method and apparatus disclosed herein is the testing of obfuscation algorithms. For example, if an experimental obfuscation algorithm has been created for obfuscating an email address, then an email address may be created, selected as sensitive content, and obfuscated. If an unacceptable amount of unsolicited email is received at the email address, then the obfuscation algorithm may be deemed unsafe and not proper for use.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for protecting sensitive content, the computer implemented method comprising:

responsive to receiving a selection of content, determining that the content contains an email address;

generating, by a computer processor, a sensitive content reference for publication of the content containing the email address on a web page;

responsive to receiving a request from a requestor for the content containing the email address, obfuscating the email address using a selected obfuscation algorithm to form obfuscated content;

returning the obfuscated content to the requestor, wherein the obfuscated content is published on the web page in place of the content, and wherein publishing the obfuscated content protects the email address from detection by a data collection bot; and responsive to receiving a threshold number of unsolicited emails at the email address, identifying the selected obfuscation algorithm as unsafe, wherein the threshold number is specified in an obfuscation algorithm policy, wherein the selected obfuscation algorithm is selected according to one or more conditions specified in the obfuscation algorithm policy, wherein the one or more conditions comprise a type of the content and an amount of time that the obfuscation algorithm has been used.

2. The computer implemented method of claim 1, further comprising:

responsive to determining that the content does not contain the email address, publishing the content in unobfuscated form.

3. The computer implemented method of claim 1, wherein the selection of the content is made by a user.

4. The computer implemented method of claim 1, wherein the selection of the content is made automatically by a web server at serve time.

5. The computer implemented method of claim 1, wherein the obfuscated content is formed at rendering time.

6. The computer implemented method of claim 1, wherein the obfuscation algorithm is changed in response to receiving the threshold number of unsolicited emails.

7. The computer implemented method of claim 1, wherein the receiving, generating, obfuscating, returning the obfuscated content, and identifying is performed by a service provider.

8. The computer implemented method of claim 1, wherein the step of obfuscating the content is performed by a web browser before displaying the web page presenting the obfuscated content.

9. A computer program product comprising:
a computer usable storage device including computer usable program code for protecting sensitive content, the computer usable program code comprising:
computer usable program code for determining, responsive to receiving a selection of content, determining that the content contains an email address;
computer usable program code for generating a sensitive content reference for publication of the content containing the email address on a web page;
computer usable program code for, responsive to receiving a request from a requestor for the content containing the email address, obfuscating the email address using a selected obfuscation algorithm to form obfuscated content;
computer usable program code for returning the obfuscated content to the requestor, wherein the obfuscated content is published on the web page in place of the content, and wherein publishing the obfuscated content protects the email address from detection by a data collection bot; and
computer usable program code for identifying the selected obfuscation algorithm as unsafe, in response to receiving a threshold number of unsolicited emails at the email address, wherein the threshold number is specified in an obfuscation algorithm policy, wherein the selected obfuscation algorithm is selected according to one or more conditions specified in the obfuscation algorithm policy, wherein the one or more conditions comprise a type of the content and an amount of time that the obfuscation algorithm has been used.

10. The computer program product of claim 9, further comprising:
computer usable program code for publishing the content in unobfuscated form in response to determining that the content does not contain the email address.

11. The computer program product of claim 9, wherein the selection of the content is made automatically by a web server at serve time.

12. The computer program product of claim 9, wherein the obfuscated content is formed at rendering time.

13. The computer program product of claim 9, wherein the obfuscation algorithm is changed in response to receiving the threshold number of unsolicited emails.

14. The computer program product of claim 9, wherein the receiving, generating, obfuscating, returning the obfuscated content, and identifying is performed by a service provider.

15. The computer program product of claim 9, wherein the computer usable program code for performing the step of obfuscating the content is performed by a web browser before displaying the web page presenting the obfuscated content.

16. An apparatus comprising:
a bus system;
a communications system connected to the bus system;
a memory connected to the bus system, wherein the memory includes computer usable program code; and
a processing unit connected to the bus system, wherein the processing unit executes the computer usable program code to determine, responsive to receiving a selection of content, determine whether the content contains an email address; generate a sensitive content reference for publication of the content containing the email address on a web page; responsive to receiving a request from a requestor for the content containing the email address obfuscate the email address using a selected obfuscation algorithm to form obfuscated content; return the obfuscated content to the requestor, wherein the obfuscated content is published on the web page in place of the content, and wherein publishing the obfuscated content protects the email address from detection by a data collection bot; and identify the selected obfuscation algorithm as unsafe, in response to receiving a threshold number of unsolicited emails at the email address, wherein the threshold number is specified in an obfuscation algorithm policy, wherein the selected obfuscation algorithm is selected according to one or more conditions specified in the obfuscation algorithm policy, wherein the one or more conditions comprise a type of the content and an amount of time that the obfuscation algorithm has been used.

17. The apparatus of claim 16, wherein the processing unit executes computer usable program code for publishing the content in unobfuscated form in response to determining that the content does not contain the email address.

18. The apparatus of claim 16, wherein the processing unit executes computer usable program code to change the obfuscation algorithm in response to receiving the threshold number of unsolicited emails.

* * * * *